(12) United States Patent
Wilkinson

(10) Patent No.: US 9,715,477 B2
(45) Date of Patent: *Jul. 25, 2017

(54) SHARED-BANDWIDTH MULTIPLE TARGET REMOTE COPY

(71) Applicant: International Business Machines Corporation, Armonk, NY (US)

(72) Inventor: John P. Wilkinson, Salisbury (GB)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/951,292

(22) Filed: Nov. 24, 2015

(65) Prior Publication Data

US 2016/0077743 A1 Mar. 17, 2016

Related U.S. Application Data

(63) Continuation of application No. 13/756,290, filed on Jan. 31, 2013, now Pat. No. 9,218,313, which is a (Continued)

(30) Foreign Application Priority Data

Sep. 3, 2009 (EP) .................................. 09169353

(51) Int. Cl.
G06F 15/173 (2006.01)
G06F 3/06 (2006.01)
G06F 11/20 (2006.01)

(52) U.S. Cl.
CPC ...... G06F 15/17306 (2013.01); G06F 3/0604 (2013.01); G06F 3/065 (2013.01);
(Continued)

(58) Field of Classification Search
CPC ........... G06F 17/30206; H04L 67/1095; H04L 67/1097; H04L 2012/568; H04L 47/125
(Continued)

(56) References Cited

U.S. PATENT DOCUMENTS 6,237,008 B1 5/2001 Beal et al.
6,526,419 B1 2/2003 Burton et al.
(Continued)

FOREIGN PATENT DOCUMENTS

WO 2011026661 A1 3/2011

OTHER PUBLICATIONS

Notice of Allowance from U.S. Appl. No. 13/393,809, dated Jan. 22, 2016.
(Continued)

Primary Examiner — Scott M Sciacca
(74) Attorney, Agent, or Firm — Zilka-Kotab, P.C.

(57) ABSTRACT

In one embodiment, a method is provided for sharing bandwidth in a data processing system having a plurality of locations. The method includes splitting data into a plurality of data elements. The method also includes sending, from a sender, each one of the plurality of data elements to a different location selected from the plurality of locations. The method further includes sending a message from the sender to each of the locations receiving one of the data elements, where the message is sent from the sender separate from the data elements. The message includes information about the data elements, and for each location receiving one of the data elements, an address of the location. The message includes all of the addresses of all of the locations of the plurality of locations receiving one of the data elements of the data.

17 Claims, 6 Drawing Sheets

Related U.S. Application Data continuation of application No. 13/393,809, filed as application No. PCT/EP2010/057044 on May 21, 2010, now Pat. No. 9,436,653.

(52) U.S. Cl.
CPC .......... *G06F 3/0613* (2013.01); *G06F 3/0635* (2013.01); *G06F 3/0689* (2013.01); *G06F 11/2058* (2013.01); *G06F 11/2066* (2013.01); *G06F 2206/1012* (2013.01)

(58) Field of Classification Search
USPC ............................. 709/216, 217, 219, 245
See application file for complete search history.

(56) References Cited

U.S. PATENT DOCUMENTS

| | | | |
|---|---|---|---|
| 7,318,133 | B2 | 1/2008 | Yagawa et al. |
| 7,346,734 | B2 | 3/2008 | Chen et al. |
| 7,472,241 | B2 | 12/2008 | Uchiyama et al. |
| 7,490,205 | B2 | 2/2009 | Benhase et al. |
| 7,769,722 | B1 | 8/2010 | Bergant et al. |
| 9,218,313 | B2 | 12/2015 | Wilkinson |
| 9,436,653 | B2 | 9/2016 | Wilkinson |
| 2002/0120874 | A1 | 8/2002 | Shu et al. |
| 2006/0259573 | A1* | 11/2006 | Goodman ............. H04L 67/104 709/217 |
| 2007/0067670 | A1 | 3/2007 | Ebsen et al. |
| 2007/0118840 | A1 | 5/2007 | Amaki et al. |
| 2007/0239934 | A1 | 10/2007 | Watanabe |
| 2010/0037056 | A1 | 2/2010 | Follis et al. |
| 2010/0150157 | A1 | 6/2010 | Wang et al. |
| 2011/0071841 | A1 | 3/2011 | Fomenko et al. |
| 2012/0166588 | A1 | 6/2012 | Wilkinson |
| 2013/0144977 | A1 | 6/2013 | Wilkinson |

OTHER PUBLICATIONS

Non-Final Office Action from U.S. Appl. No. 13/756,290, dated Dec. 4, 2014.
Non-Final Office Action from U.S. Appl. No. 13/393,809, dated Dec. 4, 2014.
Final Office Action from U.S. Appl. No. 13/393,809, dated May 20, 2015.
Final Office Action from U.S. Appl. No. 13/756,290, dated May 19, 2015.
Non-Final Office Action from U.S. Appl. No. 13/393,809, dated Oct. 7, 2013.
Final Office Action from U.S. Appl. No. 13/393,809, dated Apr. 22, 2014.
Advisory Action from U.S. Appl. No. 13/393,809, dated Aug. 7, 2015.
Non-Final Office Action from U.S. Appl. No. 13/756,290, dated Oct. 28, 2013.
Final Office Action from U.S. Appl. No. 13/756,290, dated Apr. 28, 2014.
Notice of Allowance from U.S. Appl. No. 13/756,290, dated Aug. 12, 2015.
International Search Report and Written Opinion from PCT Application No. PCT/EP2010/057044, dated Jul. 29, 2010.
Corrected Notice of Allowance from U.S. Appl. No. 13/756,290, dated Sep. 4, 2015.
Wilkinson, U.S. Appl. No. 13/393,809, filed Mar. 1, 2012.
Wilkinson, U.S. Appl. No. 13/756,290, filed Jan. 31, 2013.

\* cited by examiner

SHARED-BANDWIDTH MULTIPLE TARGET REMOTE COPY

BACKGROUND

The present invention relates to copying data between storage devices. In particular, the invention relates to a method for sharing bandwidth between multiple remote copy targets.

Peer to Peer Remote Copy (PPRC) is a method to replicate a storage volume to another storage unit over extended distances to a remote site. PPRC is used to provide business continuity and disaster recovery capabilities. A PPRC may be performed synchronously or asynchronously. In Synchronous PPRC, each write to a local site is performed to the remote site as well. The Synchronous PPRC is complete when the write completes to both sites. An example of a Synchronous PPRC implementation is IBM® Metro Mirror (IBM is a registered trademark of International Business Machines Corporation in the United States, other countries, or both.) In Asynchronous PPRC, each write is made to the local site, and then copied to the remote site when time permits. The Asynchronous PPRC is complete when the write completes to the local site. Different copy functions may be combined to provide remote copy functionality. For example, a Point in Time copy may be made at the local site between a source volume and a target volume, and then a remote copy may be made from the target volume to a remote site. An example of a combinatorial implementation is IBM Global Mirror. PPRC may be used to provide very fast data recovery due to failure of the primary site.

PPRC may also be extended to more than one remote site to improve business continuity and disaster recovery capabilities.

If an organisation has three sites, A, B, and C, and wishes to replicate data from a storage system at A onto similar systems at B and C using a PPRC method, a high-bandwidth network connection is required from A to B, and from A to C. An example of a suitable network connection protocol is Fibre Channel (FC). However, FC links are expensive as they are priced by distance and bandwidth.

BRIEF SUMMARY

In one embodiment, a method is provided for sharing bandwidth in a data processing system having a plurality of locations. The method includes splitting data into a plurality of data elements. The method also includes sending, from a sender, each one of the plurality of data elements to a different location selected from the plurality of locations. Each data element is different. The method further includes sending a message from the sender to each of the locations receiving one of the data elements, where the message is sent from the sender separate from the data elements. The message includes information about the data elements, and for each location receiving one of the data elements, an address of the location. The message includes all of the addresses of all of the locations of the plurality of locations receiving one of the data elements of the data. Also, the data is split into the plurality of data elements at a disk level, such that a storage system copying a plurality of disks splits a first half of the disks into a first one of the data elements, and splits a second half of the disks into a second one of the data elements.

In another embodiment, a method is provided for sharing bandwidth in a data processing system having a plurality of locations. The plurality of locations comprises a first location and plurality of further locations. The method includes receiving a first data element of first data from the first location and other data elements of the first data from the further locations. Each data element of the first data is different. Also, the method includes receiving, after receiving the first data element of the first data from the first location, a message from the first location. The message is sent from the first location separate from the first data element received from the first location. The message comprises an address of each of the locations of the plurality of locations having one of the data elements of the first data, such that the message includes all of the addresses of all of the locations of the plurality of locations receiving one of the data elements of the first data. Also, the first data has been split into the data elements of the first data at a disk level, such that a storage system copying a plurality of disks has split a first half of the disks into a first one of the data elements, and has split a second half of the disks into a second one of the data elements.

Computer code for implementing the methodology presented herein may be embodied on a computer program product.

Other aspects and embodiments of the present invention will become apparent from the following detailed description, which, when taken in conjunction with the drawings, illustrate by way of example the principles of the invention.

BRIEF DESCRIPTION OF THE SEVERAL VIEWS OF THE DRAWINGS

The present invention will now be described, by way of example only, with reference to preferred embodiments, as illustrated in the following figures.

DETAILED DESCRIPTION

Figure 1:
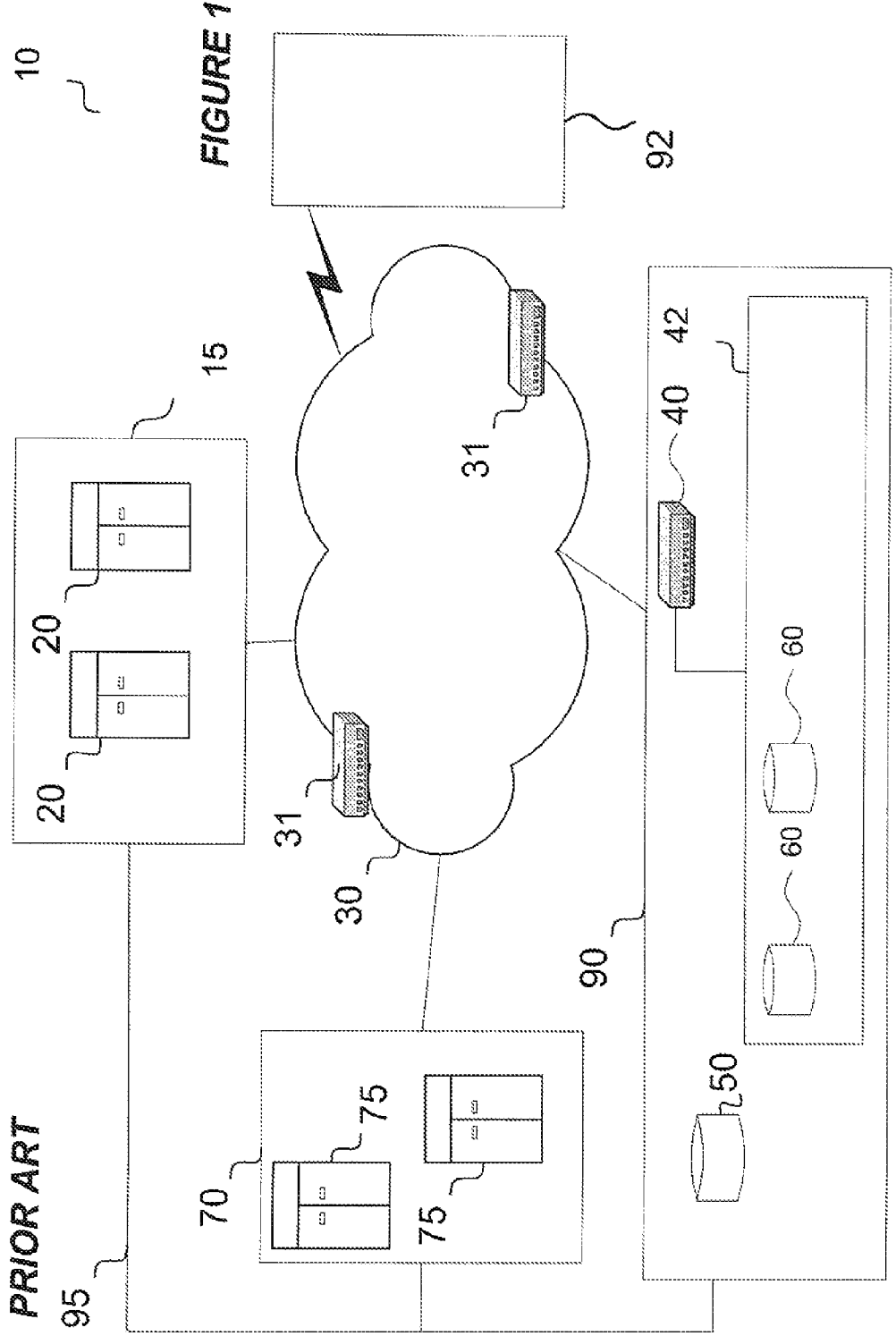
FIG. 1 is a block diagram depicting a data processing system, in accordance with the prior art.

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified.

The following description discloses several preferred embodiments of systems, methods and computer program products for sharing bandwidth in a data processing system.

One general embodiment of the present invention provides a computer management apparatus for sharing bandwidth in a data processing system, where the data processing system comprises a plurality of locations, the apparatus comprising: a split component configured to split data into a plurality of data elements; a send component configured to send each one of the plurality of data elements to a different location selected from the plurality of locations in response to the split component splitting the data, where each data element is different, responsive to the split component splitting the data; and a message component configured to send a message to each of the locations.

Advantageously, various embodiments of the present invention allow bandwidth requirements of a remote copy environment to be reduced, without reducing the amount of data that may be copied.

Another general embodiment of the present invention provides a computer management apparatus for sharing bandwidth in a data processing system, where the data processing system includes a plurality of locations typically in communication with a host, where the plurality of locations includes a first location and plurality of further locations. The apparatus includes: a receive component configured to receive a first data element; an analyze component configured to receive a message, where the message comprises an address of each of the further locations; and a send component configured to send the first data element to each of the further locations of the plurality of further locations in response to the analyze component determining the address of each of the further locations.

Advantageously, various embodiments of the present invention enable an apparatus on a remote location to forward on data to the other remote locations, and also to receive data from the other remote locations. Received data may be combined to replicate the data at the local location.

In yet another general embodiment, a method for sharing bandwidth in a data processing system that includes a plurality of locations includes splitting data into a plurality of data elements; sending each one of the plurality of data elements to a different location selected from the plurality of locations, wherein each data element is different; and sending a message to each of the locations.

In a further general embodiment of the present invention, a method for sharing bandwidth in a data processing system, wherein the data processing system comprises a plurality of locations, typically in communication with a host, and where the plurality of locations comprises a first location and plurality of further locations, the method comprising the steps of: receiving a first data element; receiving a message, wherein the message comprises an address of each of the further locations; and sending the first data element to each of the further locations of the plurality of further locations, responsive to determining the address of each of the further locations.

In yet another general embodiment, a system for sharing bandwidth in a data processing system having at least one local location and a plurality of remote locations is provided. The system includes: a local apparatus operable on the at least one local location, wherein the local apparatus comprises: a split component operable for splitting data into a plurality of data elements; a first send component, operable for sending each one of the plurality of data elements to a different remote location selected from the plurality of remote locations, wherein each data element is different, responsive to the split component splitting the data; and a message component, operable for sending a message to each of the remote locations; and a remote apparatus, operable on each remote location, wherein the remote apparatus comprises: a receive component, operable for receiving a first data element selected from the plurality of data elements; an analyze component, operable for receiving the message, wherein the message comprises an address of each of the other remote locations; and a second send component, operable for sending the first data element to each of the other remote locations, responsive to the analyze component determining the address of each of the other remote locations.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as "logic," a "circuit," "module," or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a non-transitory computer readable storage medium. A non-transitory computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the non-transitory computer readable storage medium include the following: a portable computer diskette, a hard disk, a random access memory (RAM), a read-only memory (ROM), an erasable programmable read-only memory (EPROM or Flash memory), a portable compact disc read-only memory (e.g., CD-ROM), a Blu-ray disc read-only memory (BD-ROM), an optical storage device, a magnetic storage device, or any suitable combination of the foregoing. In the context of this document, a non-transitory computer readable storage medium may be any tangible medium that is capable of containing, or storing a program or application for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a non-transitory computer readable storage medium and that can communicate, propagate, or transport a program for use by or in connection with an instruction execution system, apparatus, or device, such as an electrical connection having one or more wires, an optical fibre, etc.

Program code embodied on a computer readable medium may be transmitted using any appropriate medium, including but not limited to wireless, wireline, optical fibre cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer, for example through the Internet using an Internet Service Provider (ISP).

Aspects of the present invention are described herein with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

FIG. 1 is a block diagram depicting a data processing system 10, in accordance with the prior art, and which may be modified and improved to include an embodiment of the present invention may be implemented.

The illustrated data processing system 10 comprises a host server node subsystem 15 having a set of server nodes 20, which are connectable through a network 30 to a back-end storage subsystem 90. A network 30 typically comprises network devices 31, for example switches, and cabling that connect a server node subsystem 15 to a hardware back-end storage subsystem 90. The storage subsystem 90 may comprise a variety of physical storage devices having, for example, stand-alone a Just a Bunch of Disks (JBOD) device 50, and a Redundant Array of Independent Disks (RAID) array 42. The RAID array 42 comprises a plurality of storage devices 60. Devices 42, 50 may be presented to the server node subsystem 15 as a set of physical or logical storage volumes (not depicted). Typically the system 10 is managed by a management subsystem 70 comprising management servers 75, connectable to the server node subsystem 15, the storage subsystem 90, and the network devices 31 through the network 30 or through a separate Local Area Network (LAN) 95. Typically, a RAID Controller 40 controls the functionality of the RAID array 42, including data accesses and power controls to the individual storage devices 60. Read and write commands may be sent to the storage subsystem 90 by a requester (not depicted) that may be an application program operable in the data processing system 10. A further storage subsystem 92 may be present at a remote site.

Figure 2:
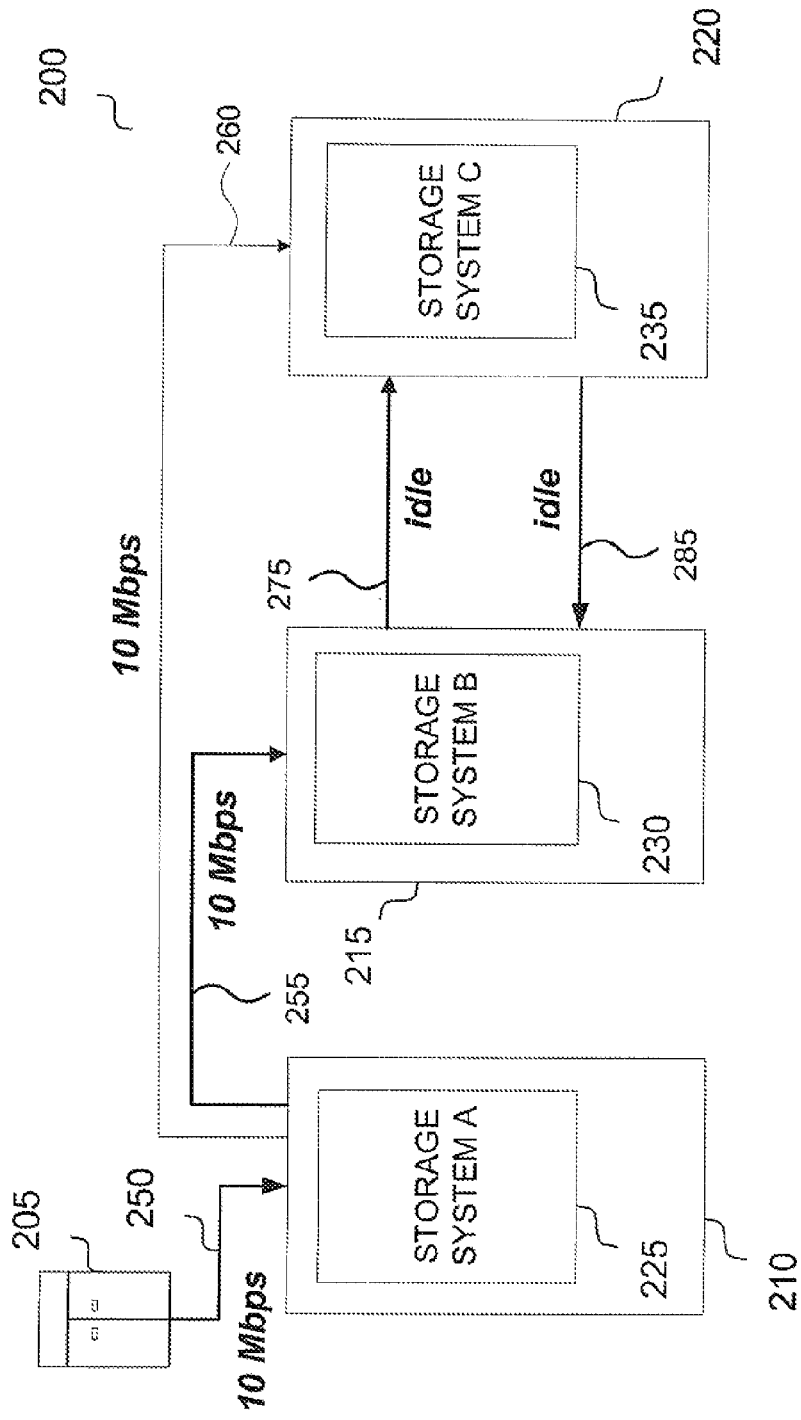
FIG. 2 is also a block diagram depicting a data processing system, in accordance with the prior art.

FIG. 2 is also a block diagram depicting a data processing system 200, in accordance with the prior art, and which may be modified and improved to include an embodiment of the present invention. FIG. 2 depicts an exemplary data processing system 200 with a local site 210, and two remote sites 215, 220. A host server node subsystem 205 is connectable through a network 250 to a local back-end storage subsystem A 225 at local site 210. The local site 210 is connectable to remote site B 215 through output network 255 and input network (not depicted). Local site 210 is connectable to remote site C 220 through output network 260 and input network (not depicted). There are also network connections 275, 285 between remote site B 215 and remote site C 220. Remote site B 215 comprises a storage subsystem B 230, and remote site C 220 comprises a storage subsystem C 235.

As an example, according to the prior art, if replication is required at rate of 10 Mbps, the network connections from the local site 210 to remote site B 215 (A→B), and from local site 210 to remote site C 220 (A→C) each need to have 10 Mbps of bandwidth. The same stream of data is sent from local site 210 to remote site B 215 (A→B) as is sent from local site 210 to remote site C 220 (A→C). For symmetry and redundancy, there is a link 275, 285 from remote site B 215 to remote site C 220, also with a 10 Mbps bandwidth. The host server node subsystem 205 writes data on network 250 to the local site 210 at 10 Mbps. To replicate writes to remote site B 215 and remote site C 220, network 255, 260 with 10 Mbps of bandwidth are required. The remaining networks 275, 285 are idle, except for non-data traffic.

Data may be sent from A→B, and then remote site B 215 may forward the data to remote site C 220. This still requires the links to be able to cope with 10 Mbps of bandwidth.

Figure 3:
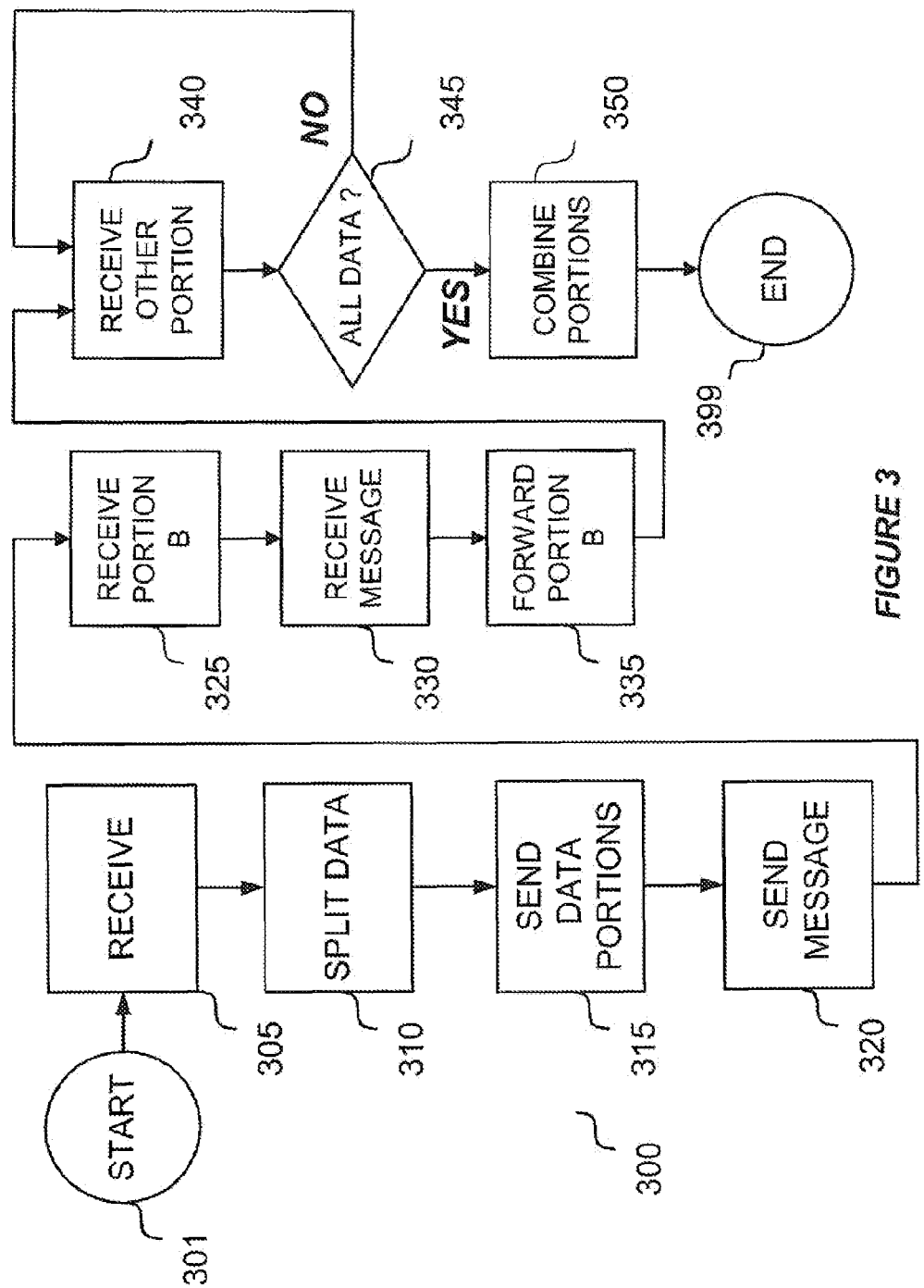
FIG. 3 is a high-level exemplary schematic flow diagram depicting typical operation method steps performed for copying data in a data processing system, in accordance with a preferred embodiment of the present invention.
Figure 4:
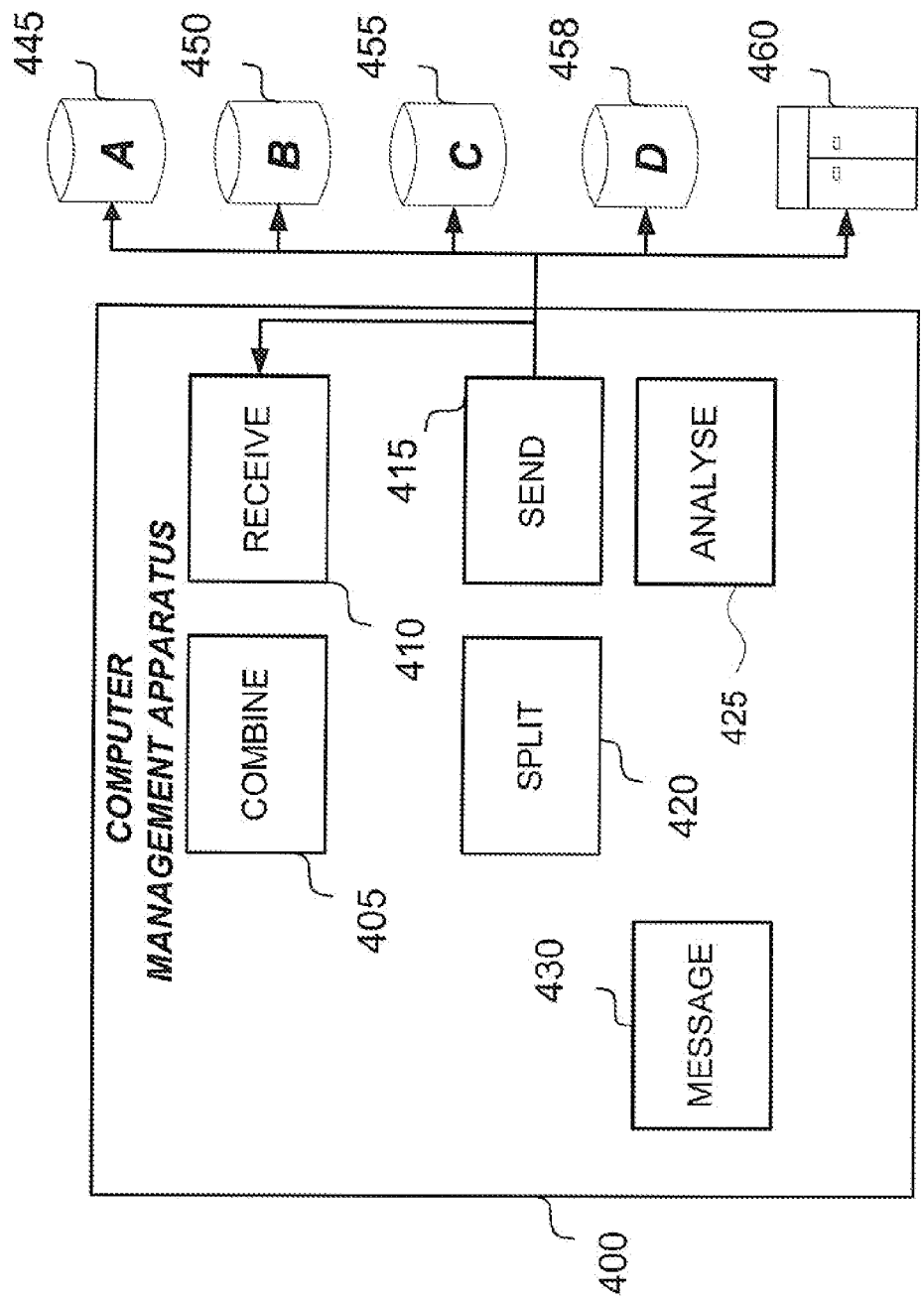
FIG. 4, is an exemplary block diagram depicting a computer management apparatus in which the present invention may be embodied.
Figure 5:
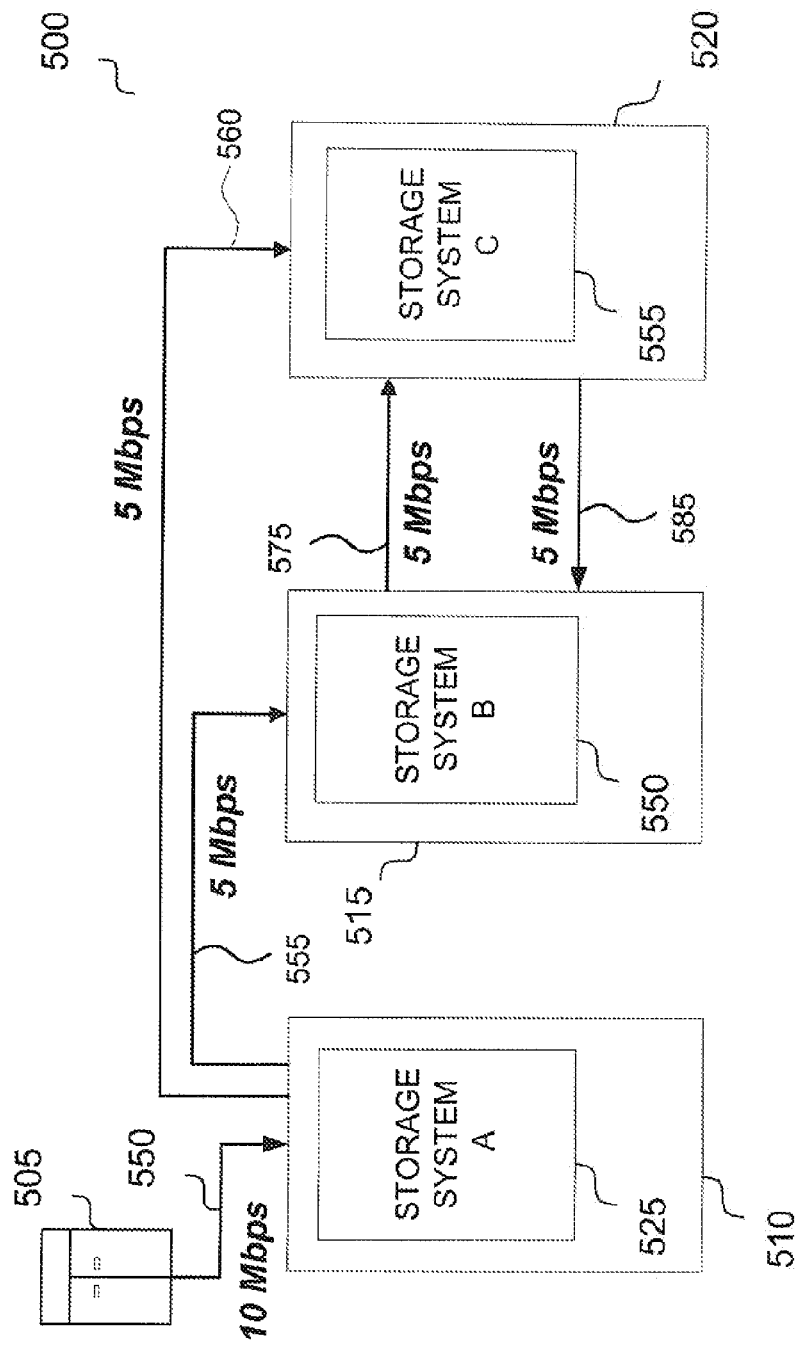
FIG. 5 is also a block diagram depicting a data processing system, in which a preferred embodiment of the present invention may be implemented.

FIG. 3, which may be read in conjunction with FIGS. 4 and 5, is a high-level exemplary schematic flow diagram 300 depicting typical operation method steps performed for copying data in a data processing system, in accordance with a preferred embodiment of the present invention. FIG. 4, is an exemplary block diagram depicting a computer management apparatus in which various embodiments of the present invention may be embodied. FIG. 5 is also a block diagram depicting a data processing system 500, in which a preferred embodiment of the present invention may be implemented. FIG. 5 depicts an exemplary data processing system 500 with a local site 510 and two remote sites 515, 515.

Referring to FIGS. 4-5, respectively, in a preferred embodiment of the present invention, the data is split at local site 445, 510 into portions. One portion is sent on network 555 to remote site B, 450, 515 and the other portion is sent on network 560 to remote site C 455, 520. Remote site B 450, 515 comprises a storage subsystem B 530 and remote site C 455, 520 comprises a storage subsystem C 535. The remote sites 450, 515, 455, 515 send each other the portion that they were sent by the local site 445, 510. In a preferred embodiment the portions are of equal size. Advantageously, each network 555, 560 need only provide half the bandwidth of the prior art, e.g., as depicted in FIG. 2, but could provide faster connections.

To illustrate a preferred embodiment of the invention, an exemplary bandwidth of 10 Mbps will be used, as the required replication rate.

Referring to FIG. 3, and also with reference to the components of FIGS. 4 and 5, the method starts at step 301. Steps 305, 310, 315 and 320 are operable at the local site 445, 510. At step 310, a receive component 410 of a computer management apparatus 400 at local site 445, 510 receives data from a host server node subsystem 460, 505 over the network 550 at 10 Mbps. At step 310, a split component 420 of a computer management apparatus 400 operable at the local site 445, 510 splits the received data into different data elements: portion B and portion C. In this example, the data is split into two equal sized elements, referred to below as portions.

At step 315, a send component 415 at the local site 445, 510 sends portion B to remote site B 450, 515, and portion C to remote site C 455, 520 over the respective output networks 555, 560. The bandwidth required for both connections is 5 Mbps.

At step 320, a message component 430 at the local site 445, 510 sends a message to each of the remote sites 450, 515, 455, 520. The message comprises an address of each of the locations. In one approach, the message comprises, for example, information about both portions, and the address of the remote sites 450, 515, 455, 520.

Steps 325, 330, 335, 340 and 345 are operable at each of the remote sites. As an example, remote site B 450, 515, is used to illustrate the steps. However, an equivalent set of steps is operable at remote site C 455, 520. At step 325, a receive component at remote site B 450, 515 receives a first data element, e.g., portion B. At step 330, an analyze component 425 at remote site B 450, 515 receives the message sent at step 320 by the message component 430 at the local site 445, 510. The analyze component 425 at remote site B 450, 515 also analyzes the message to determine information about portion C, and the address of remote site C 455, 520. At step 335, a send component 415 at remote site B 450, 515 sends portion B to remote site C 455, 520 over a network 575 at 5 Mbps.

At step 340, the receive component at remote site B 450, 515 receives a second data element, e.g., portion C from remote site C 455, 520 over a network 585 at 5 Mbps. At step 345, the analyze component determines whether all portions have been received. If further portions are required, the method returns to step 340. However, if all portions have been received, at step 350, a combine component 405 at remote site B 450, 515 combines the portions, e.g., portion B and portion C and stores the resulting data. The method ends at step 399.

FIG. 3 is set forth as a logical flow chart diagram. As such, the depicted order and labelled steps are indicative of one embodiment of the presented method. Other steps and methods may be conceived that are equivalent in function, logic, or effect of one or more steps or portions thereof, of the illustrated method. Additionally the format and symbols employed are provided to explain the logical steps of the method and are understood not to limit the scope of the method.

In an alternative embodiment, the portions are of different size. Moreover, multiple data split algorithms may be used, for example by disk, or by batch.

The split of data may split at the disk level, so a storage system copying ten disks may split the first five disks into portion B, and the second five disks into portion C. In this case, the replication protocol is unaware of the split as this is a static configuration. It is limited, though, as it required the input/output (IO) workload to the ten disks to be spread such that a similar amount of data is sent to each disk. IO to any given disk may never reach the full performance of the inter-site links.

In an alternative embodiment, data is split at a batch level. Batch IO operations on local site 445, 510 may be applied on remote sites 450, 515, 455, 520. Each batch IO completing all writes from one batch before starting the next. Even batches may be sent (A→B→C). Odd batches may be sent (A→C→B). The combine component 405 may then combine the batches in the correct order.

In an alternative embodiment data is split at the write level. Writes may be sent in any order to the remote sites 450, 515, 220, 455, 520, if the local site 210, 445, 510 has not yet completed the write back to the host server node subsystem 460, 505. In this case, writes may be sent to each location alternately, e.g., (A→B→C), and (A→C→B). Messages regarding completion of IO may either come back the same path or shortcut directly back to local site 445, 510.

In a preferred embodiment, data recovery from remote site B 450, 515, to local site 445, 510 use the method of FIG. 3 to send portion B (B→A), and portion C (B→C→A). In an alternative embodiment, portion B is sent (B→A), and portion C (C→A), using the portion stored on remote site C 455, 520.

The method of FIG. 3 may also be applied to further remote sites. An example is depicted in FIG. 6.

Figure 6:
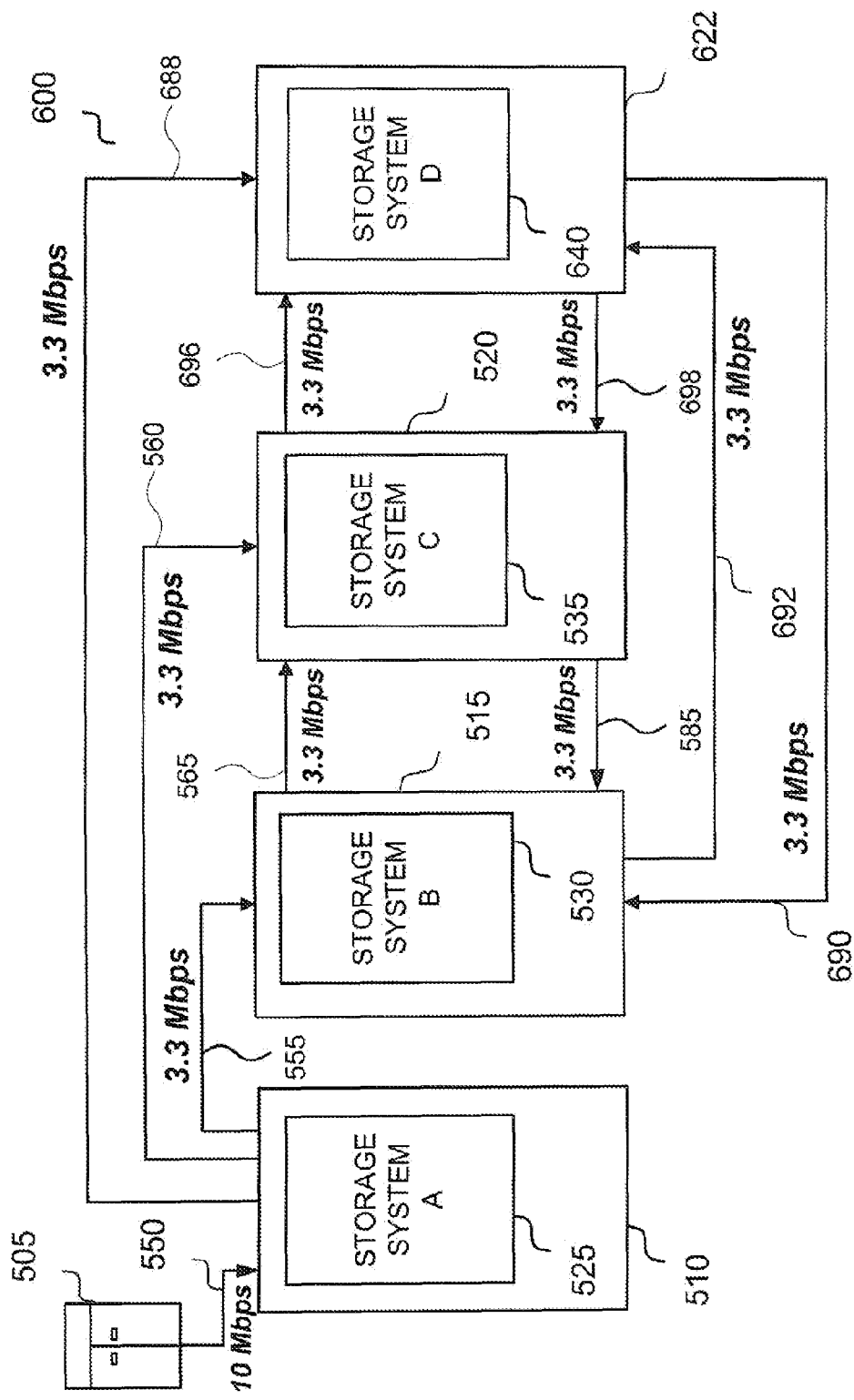
FIG. 6 is also block diagram depicting a data processing system, in which a preferred embodiment of the present invention may be implemented.

FIG. 6 is also block diagram depicting a data processing system 600 in which a preferred embodiment of the present invention may be implemented. FIG. 6 depicts an exemplary data processing system 600 similar to that 500 shown in FIG. 5, but with an additional remote site D 622 (see also 458 of FIG. 4), comprising a storage subsystem D 640. Remote site D 622 is connectable through network connections 696, 698 to remote site C 520 (see also 455 of FIG. 4), and through network connections 565, 585 to remote site B 515 (see also 450 of FIG. 4). Data received at the local site 510 at 10 Mbps is split into three portions, and sent to the remote sites 515, 520, 622 at about a third of 10 Mbps (e.g., 3.3 Mbps). Each remote site 515, 520, 622 forwards on the portion that it received to the other remote sites 515, 520, 622. The portions are combined and stored when all portions have been received. In this example connections are made at 3.3 Mbps between remote sites 515, 520, 622.

It will be clear to one of ordinary skill in the art that all or part of the method of the preferred embodiments of the present invention may suitably and usefully be embodied in a logic apparatus, or a plurality of logic apparatus, comprising logic elements arranged to perform the steps of the method and that such logic elements may comprise hardware components, firmware components or a combination thereof.

It will be appreciated that the method and arrangement described above may also suitably be performed fully or partially in software running on one or more processors (not depicted in the Figures), and that the software may be provided in the form of one or more computer program elements carried on any suitable data-carrier (also not depicted in the Figures) such as a magnetic or optical storage device or the like.

For the avoidance of doubt, the term "comprising", as used herein throughout the description and claims is not to be construed as meaning "consisting only of". Also for the avoidance of doubt, copying one location to another, as used herein throughout the description and claims, is to be construed as meaning copy the data contents of one location to the other location.

What is claimed is:

1. A method for sharing bandwidth in a data processing system having a plurality of locations, the method comprising:
    splitting data into a plurality of data elements;
    sending, from a sender, each one of the plurality of data elements to a different location selected from the plurality of locations, wherein each data element is different; and
    sending a message from the sender to each of the locations receiving one of the data elements, wherein the message is sent from the sender separate from the data elements, and the message includes:
        information about the data elements, and
        for each location receiving one of the data elements, an address of the location,
    wherein the message includes all of the addresses of all of the locations of the plurality of locations receiving one of the data elements of the data;
    wherein the data is split into the plurality of data elements at a disk level, such that a storage system copying a plurality of disks splits a first half of the disks into a first one of the data elements, and splits a second half of the disks into a second one of the data elements.

2. The method of claim 1, wherein the data is split into equal size data elements.

3. The method of claim 1, wherein the data elements are sent to each location alternately.

4. A computer program product for performing the method of claim 1, the computer program product comprising:
    a non-transitory computer readable storage medium having computer readable program code embodied therewith, the computer readable program code comprising:
        computer readable program code configured to split the data into the plurality of data elements;
        computer readable program code configured to send each one of the plurality of data elements to a different location selected from the plurality of locations; and
        computer readable program code configured to send the message to each of the locations.

5. The method of claim 1, further comprising receiving a second data element split from second data from one of the locations; receiving a second message from the one of the locations; and sending the second data element to another of the locations identified in the second message.

6. The method of claim 5, further comprising receiving a third data element split from the second data; and combining the second and third data elements for recreating the second data; and storing the second data after recreation thereof.

7. The method of claim 1, wherein the data element sent to each unique location is different than the data elements sent to the other locations.

8. A method for sharing bandwidth in a data processing system having a plurality of locations, wherein the plurality of locations comprises a first location and plurality of further locations, the method comprising:
    receiving a first data element of first data from the first location and other data elements of the first data from the further locations, wherein each data element of the first data is different; and
    receiving, after receiving the first data element of the first data from the first location, a message from the first location, wherein the message is sent from the first location separate from the first data element received from the first location, and the message comprises:
        an address of each of the locations of the plurality of locations having one of the data elements of the first data, such that the message includes all of the addresses of all of the locations of the plurality of locations receiving one of the data elements of the first data;
    wherein the first data has been split into the data elements of the first data at a disk level, such that a storage system copying a plurality of disks has split a first half of the disks into a first one of the data elements, and has split a second half of the disks into a second one of the data elements.

9. The method of claim 8, wherein the method further comprises receiving a second data element of the first data from one of the further locations.

10. The method of claim 9, wherein the method further comprises the step of combining the first data element with the second data element.

11. The method of claim 10, wherein the second data element is received from a different one of the locations than the first data element.

12. A computer program product for performing the method of claim 8, the computer program product comprising:
    a non-transitory computer readable storage medium having computer readable program code embodied therewith, the computer readable program code comprising:
        computer readable program code configured to receive the first data element; and
        computer readable program code configured to receive the message.

13. The method of claim 8, further comprising determining whether all of the data elements of the first data have been received from the plurality of locations, and further comprising combining the data elements of the first data for re-creating the first data upon determining that all of the data elements have been received.

14. The method of claim 13, wherein the first data remains stored at the first location and wherein the first data is recreated and stored locally.

15. The method of claim 8, further comprising:
    splitting third data into a plurality of third data elements, wherein each third data element is different;
    sending each one of the plurality of third data elements to a different location selected from the plurality of locations;
    sending another message to each of the locations, wherein the other message is sent separate from the third data elements, and the other message includes:
        information about the third data elements, and
        for each location receiving one of the third data elements, an address of the location, such that the message includes all of the addresses of all of the locations receiving one of the third data elements.

16. The method of claim 15, wherein the message is configured to be used by each of the locations receiving one of the data elements and the message to:
    determine the address of each of the locations receiving the other of the data elements from the first location, and
    using the addresses in the message, send the data element received by the location to each location of the plurality of locations receiving the other of the data elements from the first location.

17. The method of claim 8, comprising receiving all of the data elements of the first data; combining the received data elements thereby replicating the first data; and storing the first data.

\* \* \* \* \*